United States Patent [19]
Lappen et al.

[11] Patent Number: 5,930,351
[45] Date of Patent: *Jul. 27, 1999

[54] REMOTE TELEPHONE RINGER CONTROLLER

[76] Inventors: William Ascher Lappen, 16121 High Valley Pl., Encino, Calif. 91436; David Irwin Lappen, 625 19th St., Santa Monica, Calif. 90402

[*] Notice: This patent issued on a continued prosecution application filed under 37 CFR 1.53(d), and is subject to the twenty year patent term provisions of 35 U.S.C. 154(a)(2).

[21] Appl. No.: 08/617,182

[22] Filed: Mar. 18, 1996

[51] Int. Cl.⁶ .......................... H04M 1/21; H04M 11/02
[52] U.S. Cl. ............... 379/373; 379/93.05; 379/106.09; 379/188; 379/441
[58] Field of Search ................... 379/56, 57, 58, 379/59, 60, 61, 62, 63, 93, 96, 97, 188, 211, 322, 373, 375, 199, 387, 393, 413, 93.05, 110.1, 106.09, 441; 340/825.44, 825.46, 311.1, 328, 384.1

[56] References Cited

U.S. PATENT DOCUMENTS

| | | | |
|---|---|---|---|
| 4,405,839 | 9/1983 | Groff | 379/188 |
| 4,409,439 | 10/1983 | Gamble | 379/188 |
| 4,459,435 | 7/1984 | Foldvary et al. | 379/199 |
| 4,468,541 | 8/1984 | Cohen | 379/393 |
| 4,480,154 | 10/1984 | Klee | 379/373 |
| 4,644,106 | 2/1987 | Yeh | 379/375 |
| 4,850,013 | 7/1989 | Rose | 379/199 |
| 4,856,056 | 8/1989 | Yeh | 379/375 |
| 4,893,329 | 1/1990 | O'Brien | 379/199 |
| 4,893,336 | 1/1990 | Wuthnow | 379/375 |
| 4,958,370 | 9/1990 | Shimanuki | 379/157 |
| 5,031,205 | 7/1991 | Phillips | 379/373 |
| 5,036,534 | 7/1991 | Gural | 379/82 |
| 5,040,209 | 8/1991 | Greenberg et al. | 379/373 |
| 5,117,449 | 5/1992 | Metroka et al. | 379/58 |
| 5,191,607 | 3/1993 | Meyers et al. | 379/373 |
| 5,228,080 | 7/1993 | Nutter et al. | 379/373 |
| 5,329,578 | 7/1994 | Brennan et al. | 379/211 |
| 5,333,190 | 7/1994 | Eyster | 379/375 |
| 5,351,289 | 9/1994 | Logsdon et al. | 379/142 |
| 5,388,150 | 2/1995 | Schneyer et al. | 379/374 |
| 5,473,667 | 12/1995 | Neustein | 379/57 |
| 5,548,636 | 8/1996 | Bannister et al. | 379/210 |
| 5,570,415 | 10/1996 | Stretton et al. | 379/110.1 |
| 5,604,797 | 2/1997 | Adcock | 379/199 |
| 5,608,792 | 3/1997 | Laidler | 379/322 |
| 5,619,568 | 4/1997 | Miller | 379/188 |
| 5,661,788 | 8/1997 | Chin | 379/374 |
| 5,668,862 | 9/1997 | Bannister et al. | 379/93.01 |

*Primary Examiner*—Scott Wolinsky
*Attorney, Agent, or Firm*—Blakely, Sokoloff, Taylor & Zafman LLP

[57] ABSTRACT

A device (FIG. 1, item 110), which may be remotely controlled, inserted between a telephone (FIG. 1, item 100) and a telephone line (FIG. 1, item 120) that controls the telephone's ringer to silence it or not, to cause it to ring in a different manner to signal an event other than an incoming telephone call (FIG. 1, item 140), and/or to signal another device (FIG. 1, item 130) to indicate an incoming call.

23 Claims, 7 Drawing Sheets

REMOTE TELEPHONE RINGER CONTROLLER

BACKGROUND

1. Field of Invention

This invention relates to the methods and apparatus for remotely controlling a telephone's ringer and providing alternative signaling methods.

2. Description of Prior Art

When a telephone call comes in, the telephone rings. This ring takes place if the intended recipient of the call is asleep or otherwise doesn't want to be interrupted by a telephone call. Many telephones have the ability to control their ringer. There are often two controls for the ringer, volume and on/off Some telephones have their own distinctive ring and some allow the owner to select the style of ring. This allows differentiation between multiple lines that may ring to a single telephone.

Some telephones use other techniques to signal an incoming telephone call. One such technique is the telephone that blinks a light instead of causing an audible ring.

There have been some improvements that allow a specific telephone to be silent for a specific period of time. But there is no system for silencing a plurality of telephone ringers from one location. Nor is there any system currently for directing the telephone's ring to an alternate (inaudible) signaling device upon demand.

The present invention adds remote control capabilities to the basic ringer control. The ability to remotely silence a telephone's ringer will allow someone to prevent another from being awakened or disturbed by an incoming call.

The following existing patents seem to most closely relate to the present invention:

U.S. Pat. No. 4,893,329 describes a centralized telephone ring deferral device which operates between a telephone line and all telephones connected to the line. The device is not dedicated to any specific telephone, but governs operation of all telephones. The device can even be implemented in a telephone company's central office. While this patent generally covers the subject matter of the present invention, it is a more complicated and expensive implementation that requires keeping the time of day, adding a deferral period to the time of day and transmitting a message to a caller telling when the deferral period will end. Further, it does not allow the user to individually select which telephones should ring and which should not. Unlike the present invention, the device disclosed in this patent actually answers the telephone call.

U.S. Pat. No. 4,405,839 describes a timed telephone ring silencer device that is connected to a telephone and silences that telephone's ringer for a specific period of time.

U.S. Pat. No. 4,409,439 describes a device that uses its own chimes to signal incoming telephone calls. The device may also be set to silence the first few rings or all rings after a specified number. It may be silenced during specified intervals.

U.S. Pat. No. 4,459,435 describes a device that uses its own annunciator to announce incoming telephone calls as well as an ability to silence the ringer for a given number of rings.

U.S. Pat. No. 4,480,154 describes a device that automatically silences a telephone's ringer, based on a 24 hour clock and/or an alarm clock. The device is not remotely controlled and does not employ the use of alternative signaling devices.

U.S. Pat. No. 5,191,607 describes a device that mutes the ring on a telephone connected to a control console center capable of receiving at least two telephone calls. This allows operators to concentrate on the telephone call they are on, without the disturbance of additional telephone lines ringing. The device provides for an automatic switch back to normal operation after a set period of time, or upon call termination.

U.S. Pat. No. 5,388,150 describes an automatic incoming telephone call identification and disposition system which uses a database of telephone numbers and a calendar to route incoming calls based on who is calling and when they are calling. While the system includes ring suppress, it requires significant hardware and databases to implement. The disclosed device works on a call-by-call basis and is used to ring different extensions (or answering machines or faxes) based on the identity of the caller and the information contained in the disposition calendar. The device requires replacement of existing telephone equipment or rewiring of existing premise wiring.

There is currently no system for remotely controlling a telephone's ringer or signaling other remote devices that a telephone call is coming in.

OBJECTS AND ADVANTAGES

The present invention relates generally to controlling a telephone's ringer from a remote location, signaling alternative alert means, and providing alternative means for signaling certain events. The controller may silence the telephone's ringer, cause the telephone to ring in a distinctive manner, and/or cause another device to ring or otherwise signal an alert. The advantage is that the ringers on existing telephones may be silenced remotely, thereby preventing telephonic interruptions. Additionally, alternative ringing means can be provided to signal incoming telephone calls or other events. The present invention can easily be inserted by simply plugging it in between an existing telephone and the telephone line. The present invention may be operated remotely, adding to its usefulness and will not affect the operation of existing telephone answering devices or other devices connected to a telephone line.

The present invention is particularly useful when someone has fallen asleep near a telephone or is having a meeting near a telephone. From a remote location, the ringer on that telephone may be silenced so that if a call comes in the telephone will not ring.

In addition, it would be very useful to suppress the ringer on one or more telephones and cause some other device to signal an incoming call.

Further, the present invention can be used to cause the telephone, or other devices, to ring in a distinctive manner to signal some other event, such as a doorbell press.

The present invention may signal other remote devices, such as a local pager, which may be equipped with audible and/or inaudible signaling modes. This replaces the "broadcast" ring with a "narrowcast" ring. This allows a person to move around an office and have that person's private phone line alert him/her to an incoming phone call. After notification of an incoming call, the person may go to the closest phone and direct the call to ring at that extension in order to get the call. The ability to silence the ringer on all phones and use an alternate signaling device in a silent mode allows a person to move freely around a house without fear of missing calls or having those calls wake others who are sleeping.

The ability to remotely shut off audible ringers and to signal other devices provides a completely silent notification of an incoming call. This signaling method can be used for other events, such as a doorbell press.

SUMMARY OF THE INVENTION

It is the intention of the present invention to provide a simple method of silencing the ring of specific extension telephone(s) from a remote location. The present invention can use existing telephone equipment and wiring.

As an enhancement to the basic system, it is also the intention of the present invention to allow for the ringing of a telephone with a distinctive ring to signal an event other than an incoming telephone call.

As a further enhancement to the basic system the present invention can signal an alternate signaling device, providing audible and/or inaudible signaling.

In accordance with these intentions, the present invention would be inserted between the telephone and the telephone line. It would block the ring of the telephone when in the "Ring Block" mode and allow the telephone to ring normally in the "Ring Pass-Through" mode. The present invention may be switched between the "Ring Block" and "Ring Pass-Through" modes remotely or locally. In either ring modes, the present invention can also signal other devices, or not, depending on its mode. It can also generate distinct rings to signal other events.

A more complete understanding of the invention may be obtained from the detailed description that follows taken with the accompanying drawings.

BRIEF DESCRIPTION OF THE DRAWINGS

Features, aspects and advantages of the invention will be more fully understood when considered with respect to the following detailed description, appended claims and accompanying drawings where:

DESCRIPTION OF THE PREFERRED EMBODIMENT

The following preferred embodiment is an example of the application of the present invention, but is not intended to limit in any way the claims made herein.

Figure 1:
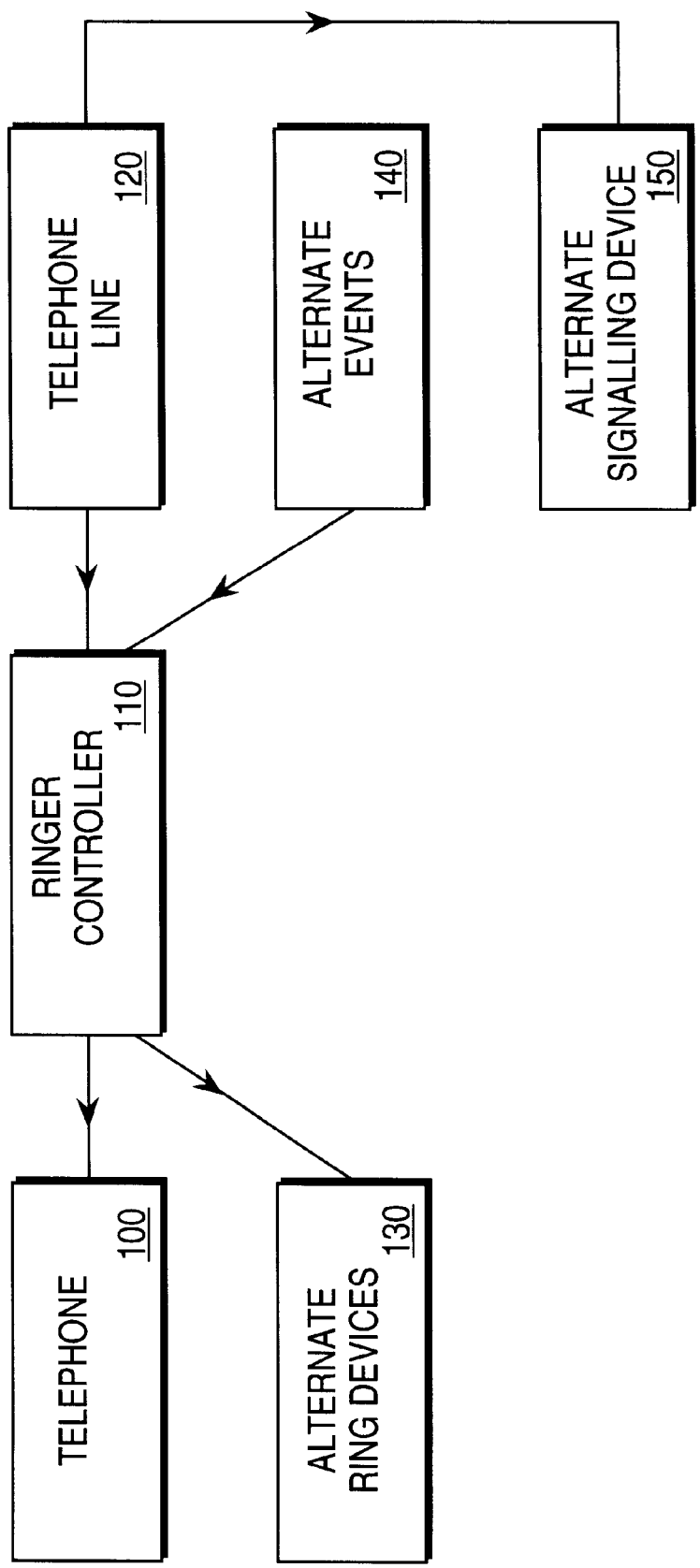
FIG. 1 is a system overview of the present invention.

In the preferred embodiment, there will be one or more Ring Controllers (FIG. 1. item 110). A standard telephone line (FIG. 1, item 120) is connected to the Ring Controller and to any other Alternate Signaling Devices (FIG. 1, item 150). The Ring Controller is connected to a standard telephone (FIG. 1, item 100) and any other Alternate Ring Devices (FIG. 1, item 130). Alternate Events (FIG. 1, item 140) may also signal the Ring Controller. The Telephone Line may also signal Alternate Signaling Devices (FIG. 1, item 150).

Figure 2:
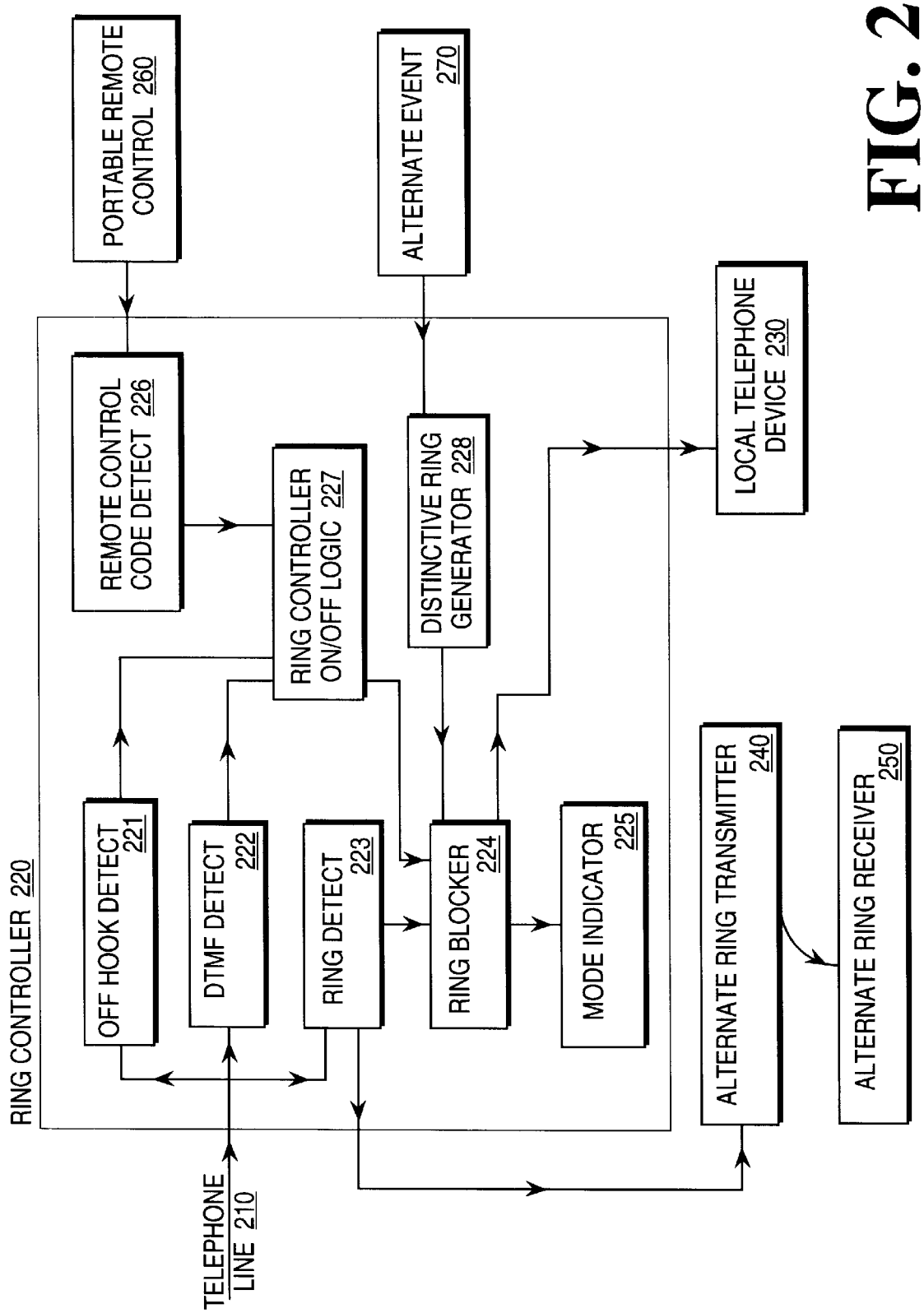
FIG. 2 is a diagrammatic representation of the components of the present invention.

The system is comprised of one major component (FIG. 2, item 220) in addition to other components normally required to operate a telephone system (telephone (FIG. 2, item 230) and telephone line (FIG. 2, item 210)) and optional other components (alternate ring transmitter (FIG. 2, item 240), alternate ring receiver (FIG. 2, item 250), remote control device(s) (FIG. 2, item 260) and alternate event(s) (FIG. 2, item 270)). The Ring Controller (FIG. 2, item 220) is comprised of several logical components (FIG. 2, items 221-228). When the Ring Controller (FIG. 2, item 220) senses off hook (FIG. 2, item 221) or DTMF signals (FIG. 2, item 222) from any telephone connected to the telephone line that the Ring Controller is connected to, that information is passed to the Ring Controller on/off logic (FIG. 2, item 227). Additionally, a portable remote control (FIG. 2, item 260) can provide commands to the Ring Controller on/off logic via the Remote Control Code Detect (FIG. 2, item 226). The Ring Controller on/off logic controls the Ring Blocker (FIG. 2, item 224) which takes input from the telephone line Ring detect (FIG. 2, item 223) and Distinctive Ring Generator (FIG. 2, item 228) and channels it to the Local Telephone Device (FIG. 2, item 230) or blocks the ring. The Ring Blocker also controls an optional Mode Indicator (FIG. 2, item 225) which indicates the mode the Ring Controller is in.

Figure 3:
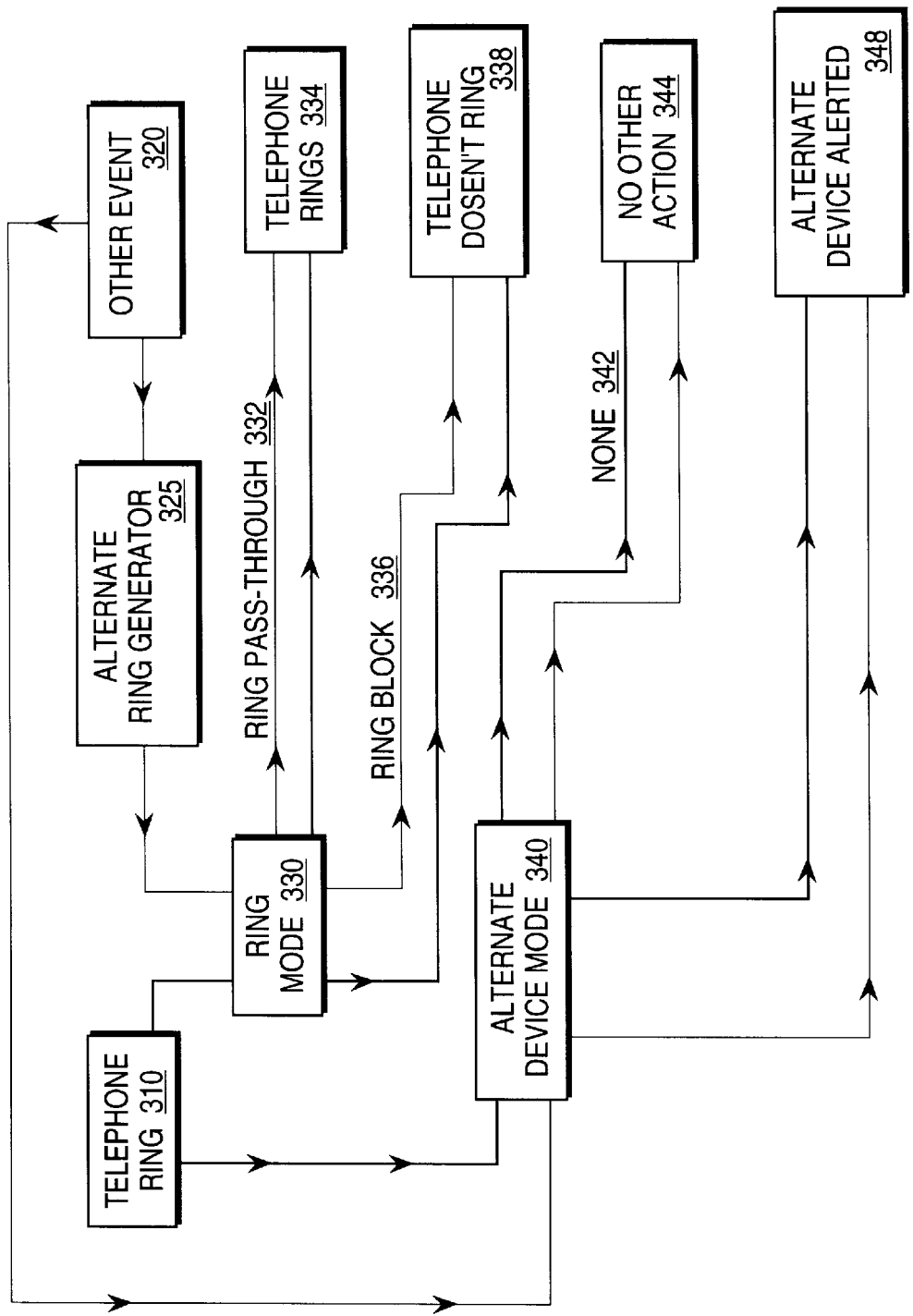
FIG. 3 is an usage logic diagram of the present invention.

FIG. 3 shows the usage logic diagram indicating which actions are taken depending on which mode the Ring Controller is in. The event Telephone Ring (FIG. 3, item 310) is passed to the Ring Mode (FIG. 3, item 330) and to the optional Alternate Device Mode (FIG. 3, item 340). If the Ring Mode is set to Pass-Through (FIG. 3, item 332), then the telephone rings (FIG. 3, item 334). If the Ring Mode is set to Ring Block (FIG. 3, item 336), then the telephone doesn't ring (FIG. 3, item 338). If the Alternate Device Mode is set to None (FIG. 3, item 342), there is No Other Action taken (FIG. 3, item 344). If the Alternate Device Mode is set to Signal Other Device (FIG. 3, item 346), then an Alternate Device is Alerted (FIG. 3, item 348). An Other Event (FIG. 3, item 320) passing through an Alternate Ring Generator (FIG. 3, item 325), if necessary, may also trigger the Ring Mode and Alternate Device Mode actions.

Figure 4:
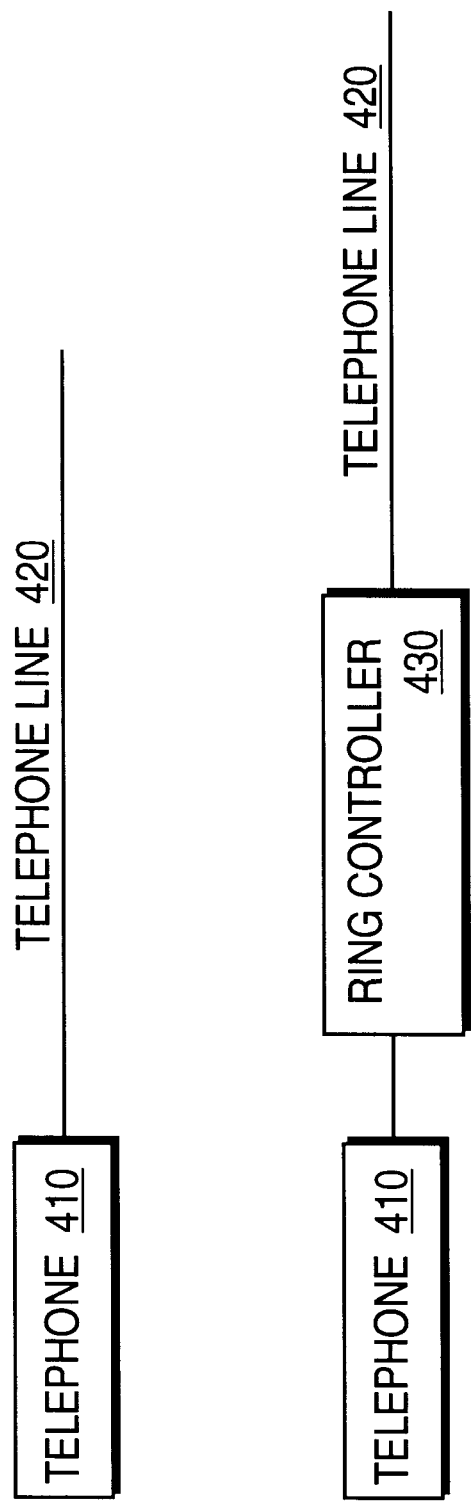
FIG. 4 is a connection diagram showing the connection of the present invention.

Prior to application of the Ring Controller, each telephone is connected directly to a telephone line, or other means serving the purpose of a telephone line (cable television, microwave transmission, satellite transmission, radio frequency transmission or other means, (FIG. 4, items 410 and 420). After application of the Ring Controller (FIG. 4, item 430), the telephone line (FIG. 4, item 420), passes through the Ring Controller prior to being connected to the telephone (FIG. 4, item 410). Similar insertions of the Ring Controller can be made on all extension telephones that are to be controlled (FIG. 7, items 720, 750 and 780) but not on those not to be controlled or other devices not to be controlled (such as a telephone answering device (FIG. 7, item 790)). Telephones not directly connected to the Ring Controller (FIG. 7, item 795) may still control other telephones via their Ring Controllers.

Figure 5:
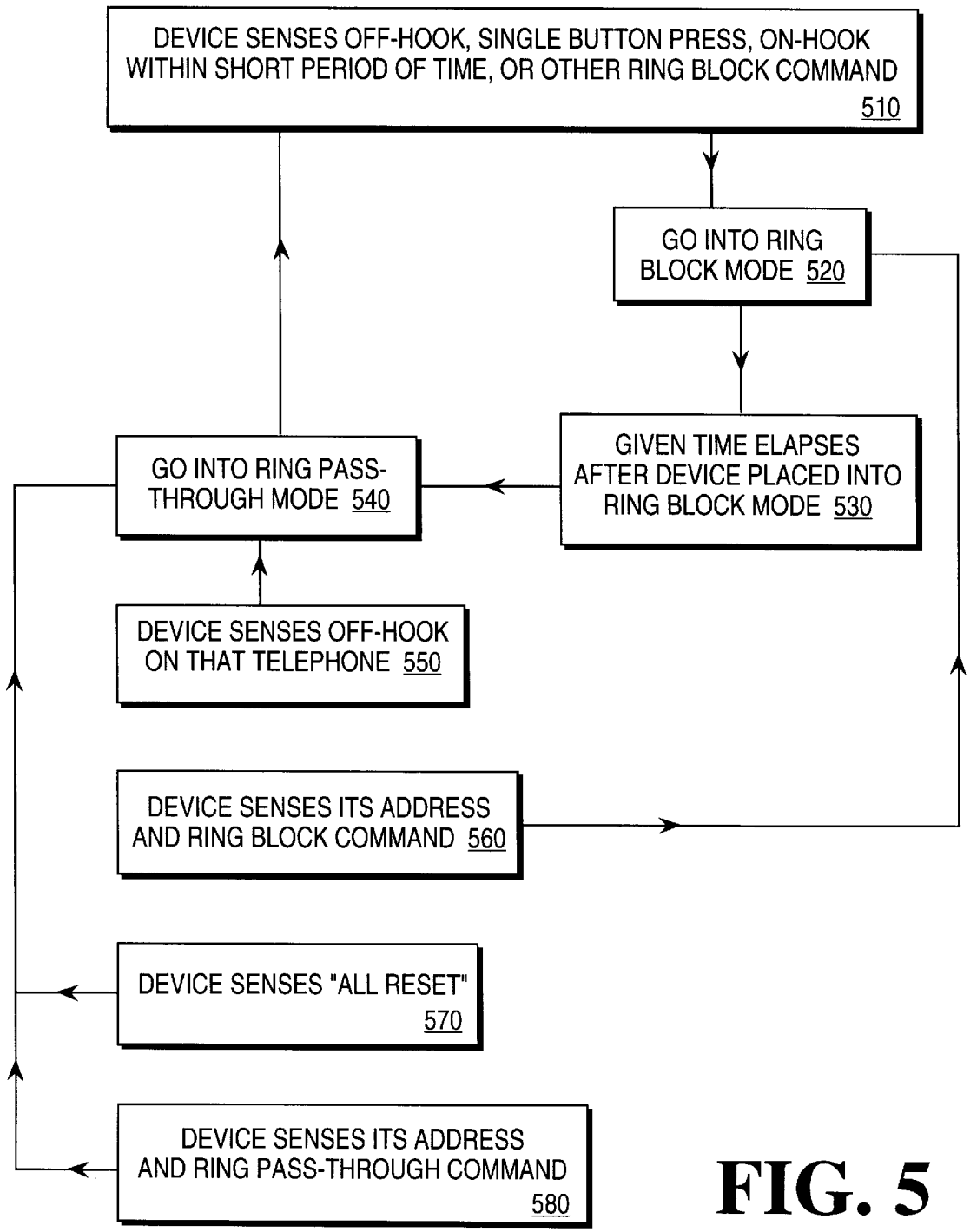
FIG. 5 is an operation logic diagram of the present invention.

To activate the Ring Controller, a person lifts the handset from any extension phone, presses any button on the keypad and then replaces the handset (FIG. 5, item 510). (Alternatively, the Ring Block command can be issued by a portable remote control device or a local pager base station.) This sets all Ring Controllers into their Ring Block mode (FIG. 5, item 520). The Ring Controller connected to that extension phone (if there is one) would make an audible tone to indicate that all Ring Controllers have been set to the Ring Block mode and all Ring Controllers could turn on a light or otherwise silently signal that they are in the Ring Block mode. To turn on the ringer on any phone equipped with the Ring Controller, the person lifts and resets the handset of that phone (FIG. 5, item 550). This does not effect any other extension telephone. It merely places that Ring Controller in the Ring Pass-Through mode, makes an audible tone and turns off the Ring Block mode indicator light (or other silent signal).

Each Ring Controller would have its own automatic reset circuitry and would automatically return that Ring Controller to the Ring Pass-Through mode (FIG. 5, item 540) after the expiration of a given time (FIG. 5, item 530). No audible tone would be generated to signal that the Ring Controller has returned to the Ring Pass-Through mode, but the light or other silent indicator would be turned off.

Upon sensing its unique address, that Ring Controller would take the requested action (either return to the Ring Pass-Through mode (FIG. 5, item 580) or go into the Ring Block mode (FIG. 5, item 560)). Upon sensing an "all reset" command, all Ring Controllers would return to the Ring Pass-Through mode (FIG. 5, item 570).

An alternate signaling device may also be incorporated into the system by inserting that device (or its transmitter) between the telephone line and the Ring Controller. A local pager base station can be inserted as the Alternate Signaling Device (FIG. 6, item 660) to alert a pager(s) that a phone call is coming in. The pager can be set in either the audible or inaudible (vibrator) mode, depending on the wishes of the wearer.

Figure 6:
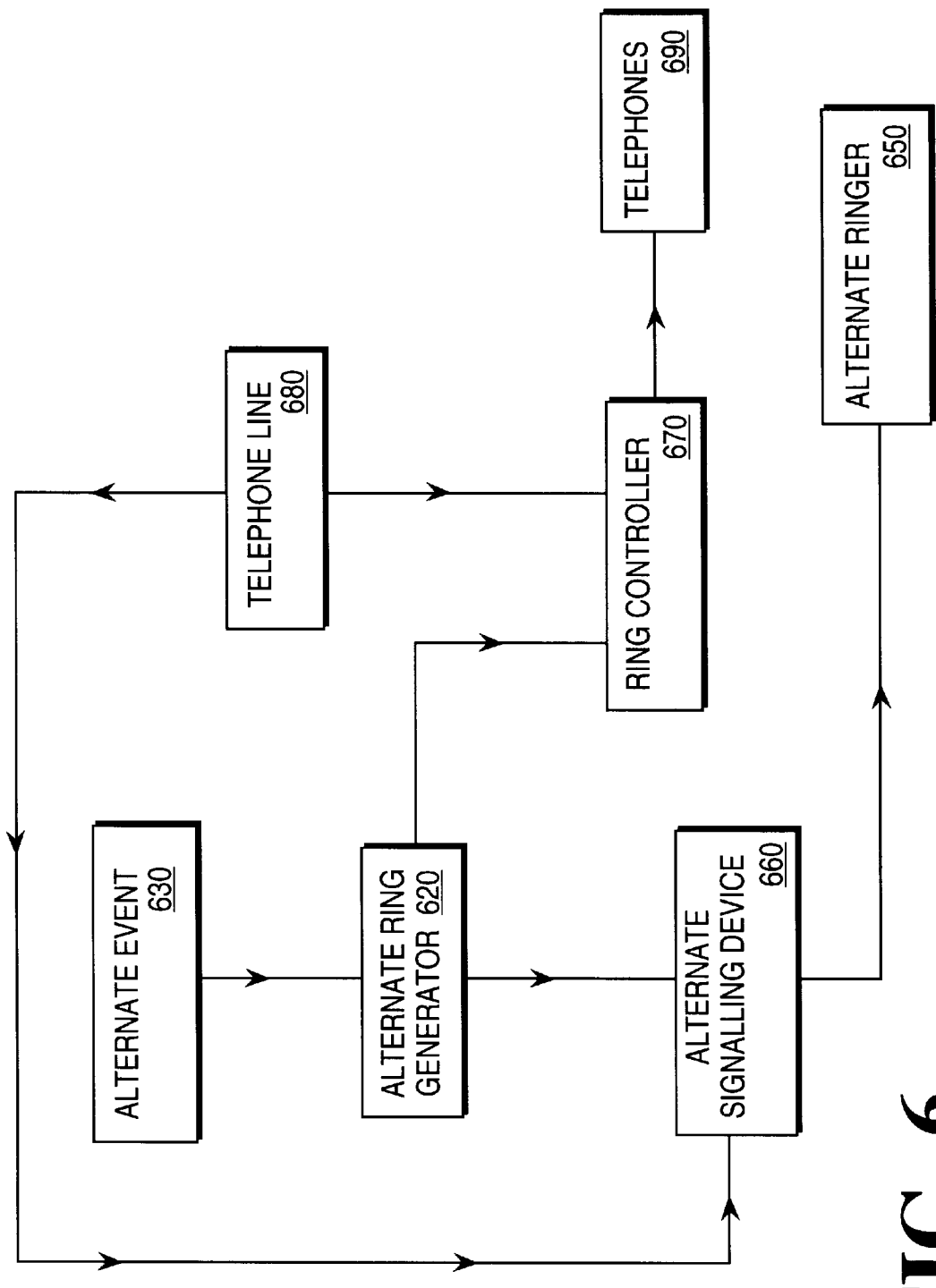
FIG. 6 is a diagrammatic representation of the connection of an alternate ring generator.

Alternate events (FIG. 6, item 630), such as a doorbell push, can be routed into an alternate ring generator (FIG. 6, item 620) for ringing telephones (FIG. 6, item 690) with a distinctive ring. Distinctive alerts can be issued to signal that the alternate event has occurred. The alternate signaling device (FIG. 6, item 660) can also be used to signal an alternate ringer (FIG. 6, item 650) upon the occurrence of a ring on a Telephone Line (FIG. 6, item 680) or an alternate event (FIG. 6, item 630).

The alternate ring generator (FIG. 6, item 620) can be used to control the Ring Controller(s) (FIG. 6, item 670) by sending a control instruction when the alternate signaling device is activated causing the Ring Controller(s) to go into the Ring Block mode. Upon its deactivation, the alternate ring generator 620 can send a control instruction to the Ring Controller(s) restoring them to the Ring Pass-Through mode.

Figure 7:
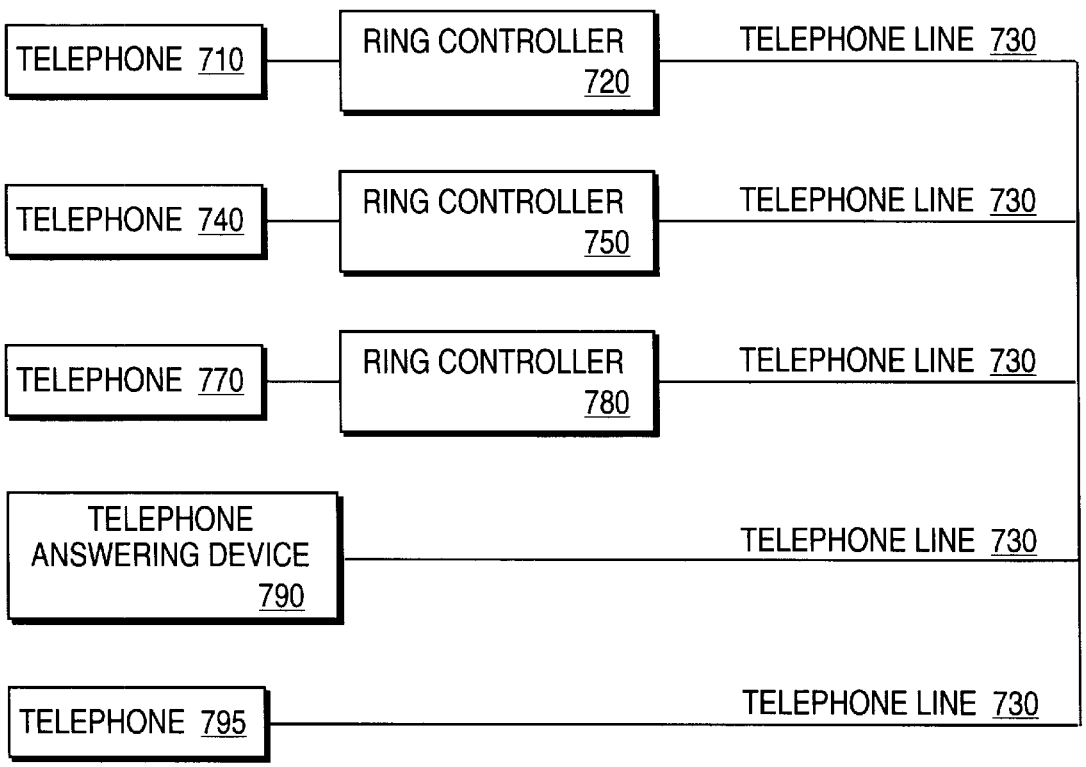
FIG. 7 is a connection diagram showing connections of multiple ring controllers.

Multiple Ring Controllers can be installed in a single residence or office. Each telephone to be controlled (FIG. 7, items 710, 740, 770) is connected to its own Ring Controller (FIG. 7, items 720, 750, 780) and then to a Telephone Line (FIG. 7, item 730). Since a Telephone Answering Device (FIG. 7, item 790) will probably not be subjected to the ring suppression of the Ring Controller, it is connected directly to the telephone line. Similarly, if there is a telephone(s) (FIG. 7, item 795) that is not to be subjected to the ring suppression of the Ring Controller, it is connected directly to the telephone line.

The present invention is not to be limited to the specific embodiments which are shown or described above and which are merely illustrative. Various and numerous other arrangements may be devised by one skilled in the art without departing from the spirit and scope of this invention.

The scope of the invention is defined in the following claims.

What is claimed is:

1. A remote telephone ring controller, comprising:
a ring blocker component having a ring block mode for blocking a ring signal from being received at a telephone connected to a telephone line via the ring blocker without answering a call and without blocking the ring signal to any other telephone connected to said telephone line, the ring blocker further including a pass through mode for passing through the ring signal; and
a ring controller component coupled to the ring blocker for receiving a remote command sent from said any other telephone while it is off-hook and for setting the ring blocker to a ring block mode or a pass through mode depending upon the remote command.

2. The remote telephone ring controller as recited in claim 1 further including a ring detect component being connectable with a telephone line for receiving a ring signal via the telephone line.

3. The remote telephone ring controller as recited in claim 1 wherein the ring controller component receives the remote command via the telephone line.

4. The remote telephone ring controller as recited in claim 1 wherein the ring controller component receives the remote command via a dedicated wire.

5. The remote telephone ring controller as recited in claim 1 wherein the ring controller component receives the remote command via a remote pager base station.

6. The remote telephone ring controller as recited in claim 1 further including a telephone connector coupled to the ring blocker for causing a telephone device to ring when the ring blocker is in the pass through mode and for preventing the telephone device from ringing when the ring blocker is in the ring block mode.

7. The remote telephone ring controller as recited in claim 6 wherein the telephone connector further includes means for coupling a plurality of telephone devices with the remote telephone ring controller, the remote telephone ring controller further including means for controlling the plurality of telephone devices as a group.

8. The remote telephone ring controller as recited in claim 6 wherein the remote telephone ring controller may receive information over the telephone line while the telephone device is on hook.

9. The remote telephone ring controller as recited in claim 1 further including automatic reset circuitry for resetting the ring blocker to a pass through mode after a predetermined time period has elapsed.

10. The remote telephone ring controller as recited in claim 1 further including a remote command transmitter for sending a remote command to a remote telephone ring controller.

11. The remote telephone ring controller as recited in claim 1 further including a remote command transmitter for sending a remote command to a local telephone ring controller.

12. The remote telephone ring controller as recited in claim 1 wherein the ring controller component receives a local command for setting the ring blocker to a ring block mode or a pass through mode depending upon the local command.

13. The remote telephone ring controller as recited in claim 12 wherein the local command results from an off-hook signal.

14. The remote telephone ring controller as recited in claim 12 wherein the local command results from a keypad key activation signal.

15. The remote telephone ring controller as recited in claim 1 further including a means for distinguishing an intended recipient of an incoming call and for signaling the intended recipient via an alternate signaling device associated with the intended recipient.

16. The remote telephone ring controller as recited in claim 1 further including an alternate signaling device to trigger an alternate alert in response to the ring signal.

17. The remote telephone ring controller as recited in claim 1 further including an alternate signaling device to trigger an alternate alert in response to an alternate event.

18. The remote telephone ring controller as recited in claim 17 further including a distinctive ring generator coupled to the ring blocker for generating a distinctive ring in response to the alternate event.

19. The remote telephone ring controller as recited in claim 1 further including a means for receiving all required electrical power from the telephone line.

20. The remote telephone ring controller as recited in claim 1 further including a unique address allowing the remote telephone ring controller to be individually controlled by a remote command including addressing information.

21. The remote telephone ring controller as recited in claim 20 wherein the unique address is user modifiable.

22. The remote telephone ring controller as recited in claim 1 further including a display for displaying a currently active mode.

23. The remote telephone ring controller as recited in claim 1 further including an alternate signaling device for causing the ring blocker to switch to a desired mode upon the occurrence of an alternate event.

* * * * *